Patented May 20, 1947

2,420,692

UNITED STATES PATENT OFFICE 2,420,692

CERAMIC DIELECTRIC COMPOSITION

Eugene Wainer, Niagara Falls, N. Y., assignor to The Titanium Alloy Manufacturing Company, Niagara Falls, N. Y.

No Drawing. Application April 10, 1943, Serial No. 482,613

8 Claims. (Cl. 106—39)

The present invention relates to dielectric materials and particularly to ceramic dielectrics wherein variation of capacity with variation in temperature may be selected by suitable choice of composition.

A property or characteristic of considerable importance in the choice of a dielectric for capacitor or condenser work is the manner in which the capacity varies with the temperature. This variation is not constant from one type of installation to another, some installations requiring a variation of capacity with variation in temperature, such that the capacity will increase with increase from a stated temperature; that is to say, a variation termed a positive temperature coefficient. The requirements of another installation may be such that a drop in capacity with increase in temperature is desired, that is to say, a negative temperature coefficient while other installations demand a substantially constant or neutral action.

Where capacitor or condenser relationships are required as components in radio and similar electrical circuits, it is generally required that they not only act as capacitors, but also as compensators for the reason that other components of the circuit or system, such as inductances, resistances and reactances, vary considerably with change in temperature. In order to prevent loss of fidelity of reception and to maintain overall general excellence of operation, these various changes must be compensated for by introducing into the system components which also vary with temperature but which vary in the opposite direction so that the sum total of performance is on an essentially uniform level throughout the normal temperature range in which the circuit or system is operated. In general, the upper limit of this temperature range in which compensation is normally required is about 85° C.; the usual range would probably be within the range of room temperature with a lower limit considerably below freezing.

In accordance with the present invention, dielectric compositions are provided which provide selectively substantially a complete range of material from which dielectric suitable for capacitor purposes can be manufactured and in which completely variable and controllable temperature coefficients from positive through neutral to negative are obtainable. Furthermore, such dielectric compositions, eminently suitable for the manufacture of capacitors for compensating purposes, possess other extremely important properties such as low power factors and dielectric constants of relatively high value all of which collectively permits the employment of a minimum amount of such compensating material, an advantage of considerable importance in most instances since space requirements are generally of a limiting value. The dielectric compositions suitable for compensating capacity purposes possess in general, the following properties:

1. High dielectric constant between 100 and 2500 at radio frequencies.
2. Power factors of useful order of magnitude.
3. Temperature coefficients which are positive, neutral or negative, depending on the composition used.
4. Variation of these temperature coefficients through the desired range by control of the composition used.
5. Direct usefulness as capacitors outside temperature coefficient use.

The highly useful results of the present invention are obtained by selectively employing combinations of the titanates of the alkaline earth metals, barium, strontium and calcium. Thus, it is possible, by employing the proper proportions of titanates of these metals, which may for instance have a negative temperature coefficient, to obtain a composition having a positive temperature coefficient. The composition having been determined upon, all as more fully explained hereinafter, in order to obtain the desired characteristic such as a suitable dielectric constant, a desirable power factor and the compensation necessary to be possessed by a condenser in a given system, the composition is selected for that purpose and the selected amounts of the titanates mixed, then formed by any of the well-known ceramic procedures and fired to vitrification, preferably all as outlined in a copending application, Serial No. 465,387, filed November 12, 1942.

The selective compositions suitable for use to produce the controlled temperature coefficient appear to fall into the following three classes, all of which are mixtures of titanates of the alkaline earth metals: Group A comprises the binary system—calcium titanate-strontium titanate; Group B the binary system—calcium titanate-barium titanate; group C comprises the ternary system—calcium titanate-strontium titanate and barium titanate.

By the employment of suitably selected amounts of the titanates constituting any of these three systems, not only can all varieties of temperature coefficients be obtained, but in addition compositions may be produced in which the temperature coefficients are uniformly variable in degree. Thus, for instance, should a circuit require a ceramic body in the capacitor which is 8% negative while the next circuit may require one which is 16% negative, by the use of the present invention these bodies may be readily manufactured by a selective choice from any of the three systems heretofore mentioned.

It has been determined that the range of composition of these various systems is relatively wide, varying from about 5% to 95% of the various individual ingredients. Thus, it has been found in accordance with the present invention that the proportions of the titanates of the alkaline earth metals heretofore specified are operative within the following ranges:

Group A: From 95 SrTiO3—5 CaTiO3 to 5 SrTiO3—95 CaTiO3

Group B: From 95 BaTiO3—5 CaTiO3 to 5 BaTiO3—95 CaTiO3

Group C: From 90 BaTiO3—5 SrTiO3—5 CaTiO3 thru 5 BaTiO3—90 SrTiO3—5 CaTiO3 to 5 BaTiO3—5 SrTiO3—90 CaTiO3

It has been found that the temperature coefficients vary in quite a regular fashion depending upon regular changes in composition or as will be more fully explained and described hereinafter. The individual titanates of barium, calcium and strontium possess temperature coefficients of capacity as follows; calcium titanate possesses a uniformly negative temperature coefficient of capacity from room temperature to 150° C. The degree of negativity up to 100° C. is about 6 parts in 116 or roughly about 5.2%. Strontium titanate is also uniformly negative up to 150° C., the degree of negativity from room temperature to 100° C. being somewhat larger than that of calcium titanate, namely 24 parts in 300 or about 8%. Barium titanate possesses a slightly negative temperature coefficient of capacity from 20° C. to about 100° C. at which point the temperature coefficient then becomes strongly positive. The degree of negativity for barium titanate is much less than that of either calcium or strontium titanate, being about 24 in 1400 up to 100° C. or roughly about 1.8%. These temperature coefficients were obtained upon samples of the titanates of calcium, barium and strontium from which the results set forth below were obtained.

A composition prepared within the range set forth above for the binary system calcium titanate-strontium titanate produces ceramic dielectric materials wherein the temperature coefficients are all uniformly negative, the amount of negativity decreasing uniformly as the amount of calcium titanate increases. For example, 95% strontium titanate and 5% calcium titanate, when mixed and fired produce a dielectric composition which is 11% negative, the 80–20 composition is 9.5% negative while the 60–40 composition is 8.5% negative. The negativity thereafter decreases to the negativity of calcium titanate itself.

However, in the system barium titanate-calcium titanate temperature coefficients from strongly positive through neutral to negative are available. For example, addition of 5 parts calcium titanate to 95 parts barium titanate will yield a positive temperature coefficient of the order of 19° up to 100° C. from materials both of which are negative in the same range. In this series the amount of positivity increases as the amount of calcium titanates increases up to about 35% calcium titanate and 65% barium titanate at which the positivity is of the order of 30%. That is to say, this high positivity is obtained from compositions in which the molal relation is about one mol calcium titanate to one mol barium titanate. Thereafter the degree of positivity decreases as the amount of calcium titanate increases, becoming essentially neutral at about 65% calcium titanate to 35% barium titanate, or a molal ratio of about 3 mols calcium titanate to one mol barium titanate. With further increase of calcium titanate, the degree of negativity decreases slowly to a limiting value equal to that of calcium titanate itself.

The ternary system, barium-strontium-calcium titanate will produce, as in the barium-calcium series, all types of temperature coefficients. Thus, dielectric bodies made of the ternary compositions and containing 40% or more barium titanate, 20% or less strontium titanate and 40% or less calcium titanate are positive. The strontium titanate may be increased to about 30% provided the barium titanate is at least 60% of the mix, and still produce bodies with a positive coefficient. Ternary compositions outside these limits are neutral or negative.

In order to prepare the dielectric body in accordance with the method of this invention, the selected quantity of the titanates desired in order to produce the necessary characteristic, are first dry mixed. Thereafter water, to the extent of 7 to 10% of the weight of the dry mix, is added and thoroughly mixed with the admixture of dry titanates. The batch is then granulated by passing through a screen, then pressed to shape and fired at the rate of about 400° F. per hour to the maturing temperature, maintained at the matured temperature for three hours and permitted to cool.

The data set forth below was obtained by pressing the stated mix into the form of a disc and firing the disc as set forth above, the disc thereafter being cleaned, coated with silver paste upon opposing faces and then fired in a conventional way and examined for the electric properties set out below.

In general the binary system A-strontium titanate-calcium titanate matures at about 2450° F.; the binary system B-barium titanate-calcium titanates matures at 2400° F. to 2450° F., while the ternary system C matures slightly lower, at about 2350° F. to 2400° F.

| Composition No. | BaTiO3 | SrTiO3 | CaTiO3 | Dielectric Constant |
|---|---|---|---|---|
| 1 | 95 |  | 5 | 813 |
| 2 | 90 |  | 10 | 765 |
| 3 | 80 |  | 20 | 687 |
| 4 | 70 |  | 30 | 570 |
| 5 | 60 |  | 40 | 560 |
| 6 | 40 |  | 50 | 460 |
| 7 | 40 |  | 60 | 355 |
| 8 | 30 |  | 70 | 250 |
| 9 | 20 |  | 80 | 220 |
| 10 | 10 |  | 90 | 182 |
| 11 | 5 |  | 95 | 155 |
| 12 |  | 95 | 5 | 271 |
| 13 |  | 90 | 10 | 289 |
| 14 |  | 80 | 20 | 290 |
| 15 |  | 70 | 30 | 263 |
| 16 |  | 60 | 40 | 249 |
| 17 |  | 50 | 50 | 229 |
| 18 |  | 40 | 60 | 201 |
| 19 |  | 30 | 70 | 184 |
| 20 |  | 20 | 80 | 167 |
| 21 |  | 10 | 90 | 152 |
| 22 |  | 5 | 95 | 144 |
| 23 | 5 | 90 | 5 | 291 |
| 24 | 42 | 33 | 25 | 719 |
| 25 | 51 | 20 | 29 | 1060 |
| 26 | 56 | 11 | 33 | 784 |
| 27 | 60 | 6 | 34 | 723 |
| 28 | 27 | 42 | 31 | 400 |
| 29 | 15 | 49 | 36 | 299 |
| 30 | 8 | 53 | 39 | 241 |
| 31 | 48 | 28 | 14 | 840 |
| 32 | 52 | 41 | 7 | 1120 |
| 33 | 54 | 42 | 4 | 1250 |
| 34 | 32 | 50 | 18 | 555 |
| 35 | 21 | 67 | 12 | 412 |
| 36 | 13 | 80 | 7 | 342 |
| 37 | 60 | 23 | 17 | 2460 |
| 38 | 74 | 15 | 11 | 1620 |
| 39 | 85 | 8 | 7 | 1220 |
| 40 | 34 | 27 | 39 | 452 |
| 41 | 24 | 19 | 57 | 256 |
| 42 | 15 | 12 | 73 | 188 |

The body compositions as indicated in the table were prepared as above and measured at 1 megacycle per second. The dielectric constant obtained is indicated in the table.

It may be seen in every case that the high dielectric constant of each composition makes these bodies useful directly as capacitors entirely outside their use as temperature compensators. Power factors in every case are below 1.5% at one megacycle. The temperature coefficient of some of these bodies are given in the following table, that of BaTiO3, SrTiO3 and CaTiO3 being given first for comparison purposes. The data indicate the dielectric constant at one megacycle at the indicated temperature.

| Temperature, °C. | BaTiO3 | SrTiO3 | CaTiO3 |
|---|---|---|---|
| 20 | 1,410 | 275 | 135.0 |
| 30 | 1,400 | 273 | 134.5 |
| 40 | 1,398 | 272 | 133.2 |
| 50 | 1,390 | 270 | 132.8 |
| 60 | 1,388 | 268 | 132.1 |
| 70 | 1,380 | 264 | 131.5 |
| 80 | 1,370 | 262 | 130.4 |
| 90 | 1,370 | 257 | 129.3 |
| 100 | 1,375 | 253 | 128.0 |
| 110 | 1,398 | 248 | 127.0 |
| 120 | 1,440 | 243 | 125.8 |
| 130 | 1,490 | 238 | 124.5 |
| 140 | 1,580 | 235 | 123.6 |
| 150 | 1,760 | 230 | 122.3 |

| Body # | #1 | #3 | #8 | #14 | #18 |
|---|---|---|---|---|---|
| 20 | 813 | 687 | 250 | 290 | 201 |
| 30 | 813 | 690 | 250 | 290 | 201 |
| 40 | 821 | 693 | 249 | 287 | 200 |
| 50 | 825 | 713 | 248 | 283 | 198 |
| 60 | 851 | 730 | 248 | 279 | 195 |
| 70 | 851 | 743 | 247 | 277 | 193 |
| 80 | 870 | 772 | 247 | 271 | 191 |
| 90 | 914 | 815 | 247 | 268 | 186 |
| 100 | 965 | 865 | 246 | 262 | 184 |
| 110 | 1,150 | 950 | 245 | 257 | 181 |
| 120 | 1,237 | 1,165 | 242 | 251 | 179 |
| 130 | 1,630 | 1,485 | 238 | 246 | 177 |
| 140 | 3,320 | 2,144 | 235 | 241 | 175 |
| 150 | 4,430 | 2,738 | 230 | 237 | 172 |

| Body # | #24 | #25 | #26 | #27 | #28 |
|---|---|---|---|---|---|
| 20 | 719 | 1,065 | 784 | 723 | 400 |
| 30 | 719 | 1,060 | 786 | 727 | 394 |
| 40 | 696 | 1,048 | 802 | 745 | 387 |
| 50 | 670 | 1,005 | 846 | 774 | 380 |
| 60 | 644 | 983 | 864 | 805 | 372 |
| 70 | 610 | 952 | 905 | 860 | 364 |
| 80 | 580 | 925 | 960 | 987 | 350 |
| 90 | 557 | 885 | 990 | 1,240 | 345 |
| 100 | 536 | 872 | 977 | 1,480 | 338 |
| 110 | 507 | 805 | 875 | 1,580 | 332 |
| 120 | 487 | 770 | 843 | 1,525 | 325 |
| 130 | 466 | 718 | 776 | 1,440 | 311 |
| 140 | 452 | 663 | 720 | 1,242 | 308 |
| 150 | 428 | 614 | 706 | 1,130 | 295 |

| Body # | #32 | #37 | #38 |
|---|---|---|---|
| 20 | 1,120 | 2,460 | 1,620 |
| 30 | 1,110 | 2,430 | 1,630 |
| 40 | 1,057 | 2,317 | 1,685 |
| 50 | 945 | 2,130 | 1,760 |
| 60 | 897 | 1,970 | 2,005 |
| 70 | 826 | 1,798 | 2,320 |
| 80 | 754 | 1,595 | 3,050 |
| 90 | 707 | 1,445 | 4,350 |
| 100 | 665 | 1,280 | 4,720 |
| 110 | 621 | 1,165 | 4,370 |
| 120 | 587 | 1,058 | 3,710 |
| 130 | 550 | 964 | 3,160 |
| 140 | 518 | 876 | 2,640 |
| 150 | 484 | 806 | 2,250 |

What is claimed is:

1. A dielectric composition having a controllable temperature coefficient of capacity comprising substantially entirely predetermined quantities of the titanates of at least two of the alkaline earth metals calcium, strontium and barium and having a dielectric constant greater than 144.

2. A dielectric composition having a controllable temperature coefficient of capacity comprising substantially entirely the titanates of at least two of the alkaline earth metals calcium, strontium and barium, the amount of one of the titanates being less than 95% of the composition and the amount of another of the titanates being greater than 5% of the composition and having a dielectric constant greater than 144.

3. A dielectric composition having a controllable temperature coefficient of capacity comprising substantially entirely the titanates of calcium and strontium, the amount of calcium titanate being less than 95% and the amount of strontium titanate being more than 5% of the composition and having a dielectric constant greater than 144.

4. A dielectric composition having a controllable temperature coefficient of capacity comprising substantially entirely the titanates of calcium and barium, the amount of calcium titanate being less than 95% and the amount of barium titanate being more than 5% of the composition and having a dielectric constant greater than 144.

5. A dielectric composition having a controlable temperature coefficient of capacity comprising substantially entirely the titanates of strontium and barium, the amount of strontium titanate being less than 95% and the amount of barium titanate being more than 5% of the composition and having a dielectric constant greater than 144.

6. A dielectric composition having a controllable temperature coefficient of capacity comprising substantially entirely the titanates of calcium, strontium and barium, the amount of calcium titanate being less than 90% and the amount of the titanates of strontium and barium being greater than 5% and having a dielectric constant greater than 144.

7. A dielectric composition having a controlabe temperature coefficient of capacity comprising substantially entirely the titanates of calcium, strontium and barium, the amount of strontium titanate being less than 90% and the amount of the titanates of calcium and barium being greater than 5% and having a dielectric constant greater than 144.

8. A dielectric composition having a controlabe temperature coefficient of capacity comprising substantially entirely the titanates of calcium, strontium and barium, the amount of barium titanate being less than 90% and the amount of the titanates of calcium and strontium being greater than 5% and having a dielectric constant greater than 144.

EUGENE WAINER.

REFERENCES CITED

The following references are of record in the file of this patent:

UNITED STATES PATENTS

| Number | Name | Date |
|---|---|---|
| 2,277,734 | Wainer et al. | Mar. 31, 1942 |
| 2,071,452 | Block | Feb. 23, 1937 |
| 2,098,812 | Pulfrich | Nov. 9, 1937 |
| 2,220,765 | Hirose et al. | Nov. 5, 1940 |
| 2,115,666 | Dorn | Apr. 26, 1932 |
| 2,277,733 | Wainer et al. | Mar. 31, 1942 |

FOREIGN PATENTS

| Number | Country | Date |
|---|---|---|
| 445,495 | Great Britain | 1936 |
| 453,707 | Great Britain | 1936 |
| 505,165 | Great Britain | 1939 |

Certificate of Correction

Patent No. 2,420,692.                                                                              May 20, 1947.

EUGENE WAINER

It is hereby certified that errors appear in the printed specification of the above numbered patent requiring correction as follows: Column 3, line 65, for "positively" read *positivity*; column 6, lines 25 and 26, lines 41 and 42, and lines 49 and 50, for "controllabe" read *controllable*; and that the said Letters Patent should be read with these corrections therein that the same may conform to the record of the case in the Patent Office.

Signed and sealed this 15th day of July, A. D. 1947.

[SEAL]

LESLIE FRAZER,
*First Assistant Commissioner of Patents.*